(12) United States Patent
Jin

(10) Patent No.: US 7,606,564 B2
(45) Date of Patent: Oct. 20, 2009

(54) APPARATUS AND METHOD FOR CALL USING HOT-KEY

(75) Inventor: Jeong-Gyu Jin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 128 days.

(21) Appl. No.: 11/128,919

(22) Filed: May 12, 2005

(65) Prior Publication Data
US 2006/0019715 A1    Jan. 26, 2006

(30) Foreign Application Priority Data
Jul. 7, 2004    (KR)    ............ 10-2004-0052551

(51) Int. Cl.
*H04M 3/00*    (2006.01)
(52) U.S. Cl. ............... 455/418; 455/445; 455/550.1; 455/566
(58) Field of Classification Search ............ 455/418, 455/566, 445, 550.1
See application file for complete search history.

(56) References Cited

U.S. PATENT DOCUMENTS

| | | | | |
|---|---|---|---|---|
| 4,639,726 A | * | 1/1987 | Ichikawa et al. | ......... 340/7.41 |
| 5,710,810 A | * | 1/1998 | Tiilikainen | ............ 379/355.09 |
| 6,650,901 B1 | * | 11/2003 | Schuster et al. | ......... 455/456.1 |
| 6,748,243 B1 | * | 6/2004 | Kubo et al. | ............ 455/569.1 |
| 6,947,730 B2 | * | 9/2005 | Ho et al. | .................... 455/417 |
| 7,174,195 B2 | * | 2/2007 | Nagamine | ................ 455/575.1 |

FOREIGN PATENT DOCUMENTS

KR    10-2003-0079543    10/2003

* cited by examiner

*Primary Examiner*—Nghi H Ly
(74) *Attorney, Agent, or Firm*—The Farrell Law Firm, LLP

(57) ABSTRACT

An apparatus and method for calling using a hot-key function in a mobile terminal are disclosed. The apparatus includes a database for storing information of search subjects, a controller for mapping extracted search subjects from the database to the keys of keypad, respectively, in accordance with a predetermined mapping mode, a display for displaying the mapped search subjects, and a keypad for calling by selecting a key of keypad, which corresponds to the position of the search subject that a user chose, on the displayed window. The method comprises displaying search subjects on a window according to a predetermined mapping mode; and selecting a keypad key, corresponding to a desired position of the search subject, on the window.

10 Claims, 7 Drawing Sheets

APPARATUS AND METHOD FOR CALL USING HOT-KEY

PRIORITY

This application claims priority under 35 U.S.C. § 119 to an application entitled "The Apparatus and Method for Call Using Hot-key" filed with the Korean Intellectual Property Office on Jul. 7, 2004 and assigned Serial No. 2004-52551, the contents of which are incorporated herein by reference.

BACKGROUND OF THE INVENTION

1. Field of the Invention

The present invention relates generally to initiating a call using hot-key function in a mobile terminal, and in particular, to an apparatus and method for searching for a telephone number and initiating a call, using a hot-key function in a mobile terminal.

2. Description of the Related Art

Along with the rapid proliferation of mobile terminals due to their convenient portability, terminal manufacturers are competing to develop mobile terminals with advanced functions, in an effort to secure more users. Recently, however, though mobile terminals with multimedia input and output devices have been widely used, the function of searching for a telephone number from a phone book and dialing has not improved effectively, in view of the convenience of users.

For example, a conventional so called "phone book" function of mobile terminals includes steps of searching phone book database based on a person's name and listing the search result in alphabetical order of matching names. The function additionally provides searching using variables such as part of telephone number, the time of storing telephone number, and classified group. The function may also provide a direct call using voice recognition.

Conventional techniques may also use abbreviated numbers having one to three figures, which are assigned to frequently used telephone numbers. This technology enables users to dial the telephone numbers by touching only the corresponding abbreviated numbers. For example, ten frequently used telephone numbers may be mapped as key numbers 0 to 9 of the keypad. However, as the quantity of abbreviated numbers increases, it becomes necessary to assign more than one digit-abbreviated number to a desired telephone number, thereby causing inconvenience to the mobile terminal user.

SUMMARY OF THE INVENTION

It is, therefore, an object of the present invention to provide an improved apparatus for initiating a call using a hot-key function in a terminal.

It is another object of the present invention to provide an improved apparatus for calling using a hot-key function by selecting a key of keypad, which corresponds to the position of telephone number, person's name, image or combinations thereof, as displayed on a window in a mobile terminal.

It is further object of the present invention to provide an improved method for calling using a hot-key function in a mobile terminal.

The above objects are achieved by an apparatus and method for connecting a call using a hot-key function by selecting a key of keypad, which corresponds to the position of telephone number, person's name, image or combinations thereof, as displayed on a window in a mobile terminal, as disclosed below.

According to one aspect of the present invention, there is provided an apparatus for connecting a call using hot-key function in a mobile terminal, that includes a database for storing search subjects such as the telephone numbers stored by a user; a controller for mapping the search subjects extracted from the database to the keys of keypad in accordance with a predetermined mapping mode; a display for displaying the mapped search subjects; and a keypad for call by selecting a key of keypad, which corresponds to the position of the search subject chosen by the user, as displayed on the window.

According to another aspect of the present invention, there is provided a method for connecting a call using a hot-key function in a mobile terminal, that includes steps of displaying search subjects extracted from a database on a window; and selecting a key of keypad, which corresponds to the position of the search subject chosen by the user for call.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described herein below with reference to the accompanying drawings. In the following description, well-known functions or constructions are not described in detail to avoid obscuring the invention with unnecessary detail.

The present invention provides an apparatus that includes a database for storing search subjects such as telephone numbers stored by a user; a controller for mapping the search subjects extracted from the database to keys of keypad in accordance with a predetermined mapping mode; a display for displaying the mapped search subjects; and a keypad for initiating a call by selecting a key of keypad that corresponds to the position of the search subject chosen by the user, as displayed on a window.

The method of the present invention includes the steps of displaying search subjects extracted from a database on a window; and selecting a key of keypad that correspond to the position of the search subject chosen by a user for calling.

Figure 1:
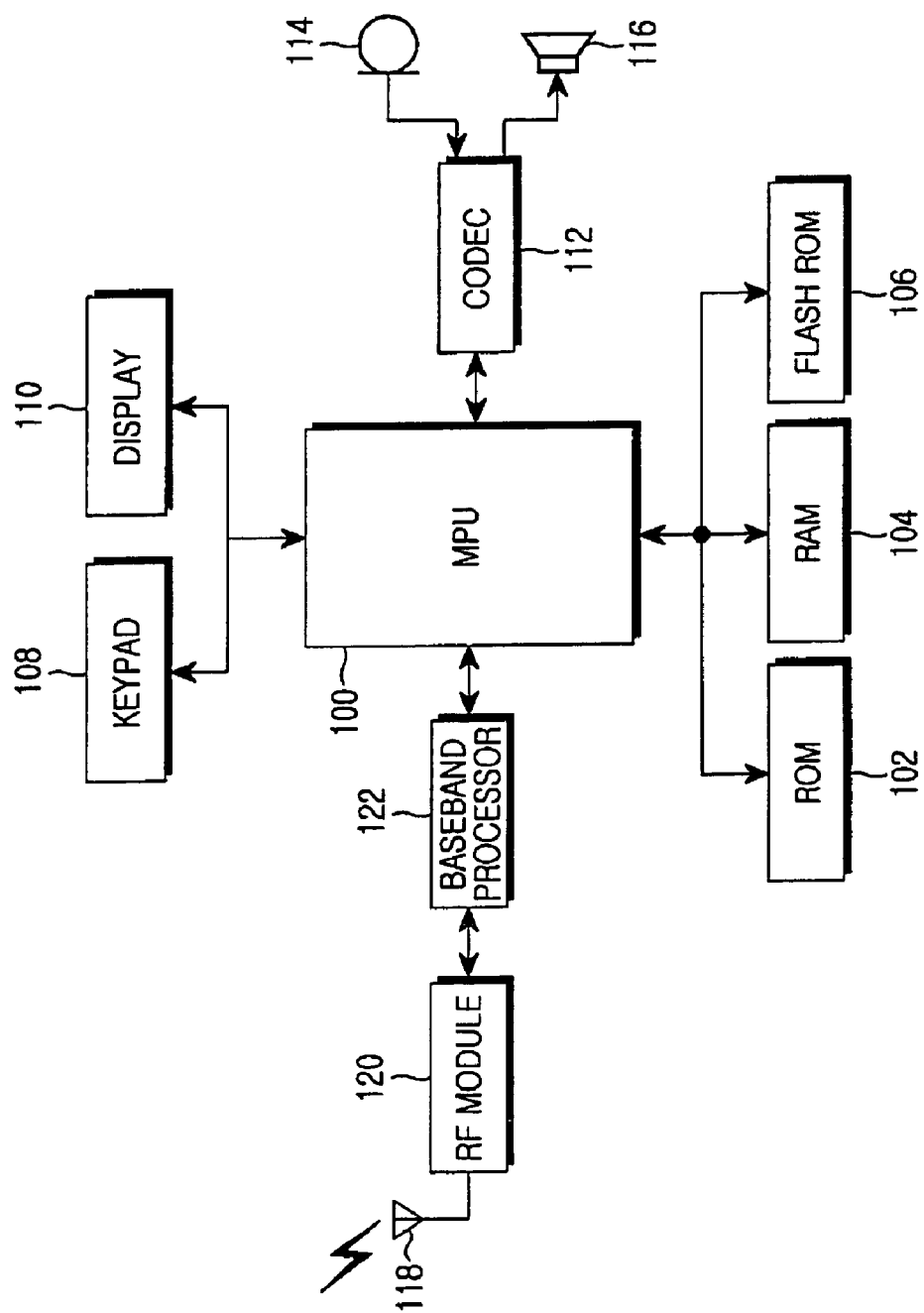
FIG. 1 is a block diagram of a mobile terminal according to the present invention.

FIG. 1 is a block diagram of a mobile terminal according to an embodiment of the present invention. The mobile terminal can include a cellular phone, PCS (Personal Communication System), PDA (Personal Digital Assistant), and IMT-2000 (International Mobile Communication-2000) terminal. The following description is provided in view of the general structures of such terminals.

Referring to FIG. 1, a controller Micro-Processor Unit (hereinafter, referred to as "controller" or "MPU") 100 provides overall control over the mobile terminal. The MPU 100 is responsible for processing and controlling voice and data communications. The MPU 100 additionally extracts, reorganizes and displays search subject information. A detailed description of the general operation of the MPU 100 is known to those of ordinary skill and accordingly is omitted herein.

A ROM (Read Only Memory) 102 stores program microcodes and reference data for the operation of the MPU 100. Particularly, it stores programs for extracting search subject information and for automatically reorganizing and displaying the extracted subject information according to the various embodiments of present invention. A RAM (Random Access Memory) 104 provides a working memory for the MPU 100, for storing temporary data generated during the execution of the programs. A flash ROM 106 functions as a database for storing updatable data to be kept, such as a phone book.

A keypad 108 includes digit keys 0 to 9 and functional keys, such as a Menu key, a Cancel (Delete) key, an OK key, a Talk key, an End key, an Internet key, and navigation (or directional) keys (▲/▼/▶/◀). The keypad 108 provides the MPU 100 with data corresponding to a user-pressed key. Particularly, four navigation keys may be used as hot-keys to directly move into a certain menu item (for example, the uppermost menu (▲), music box (▼), message management (▶) and phone book (◀)).

A display 110 displays a limited number of characters, moving pictures, still images and status information generated during the operation of the mobile terminal. An LCD (Liquid Crystal Display) may be used for the display 110.

A CODEC (Coder-Decoder) 112 connected to the MPU 100, a microphone 114 and a speaker 116 connected to the CODEC 112 collectively form a voice input/output block for voice call and voice recording. The CODEC 112 converts PCM (Pulse Code Modulation) data received from the MPU 100 to an analog voice signal and outputs the signal through the speaker 116. It also converts a voice signal received through the microphone 114 to PCM data and feeds the PCM data to the MPU 100.

Also, an RF (Radio Frequency) module 120 downconverts the frequency of an RF signal received through an antenna 118 and provides the downconverted signal to a baseband processor 122. The RF module 120 upconverts the frequency of a baseband signal received from the baseband processor 122 and transmits the upconverted signal via the antenna 118. The baseband processor 122 processes a baseband signal between the RF module 120 and the MPU 100. For example, the baseband processor 122 channel-encodes and spreads data to be transmitted, and despreads and channel-decodes received data. The baseband processor 122 is a block for demodulating channels (paging channel, traffic channel, etc.) received from the base station or for forming channels (access channel, traffic channel, etc.) to be transmitted to the base station.

In the present invention, a controller (MPU) 100 stores telephone numbers that a user inputs at the database (Flash ROM) 106 and extracts the data from the database when searching for telephone number is performed. Extracted data is displayed on the display 110 according to a matrix structure of the present invention, as described herein. Structure can be a matrix or a round-typed circles etc which owns display areas divided into a plurality spaces.

When searching for a telephone number using a hot-key is performed, the controller 100 extracts search subject information (e.g., telephone numbers) from the database 106 and maps the search subject information to keys of keypad according to a predetermined mapping mode. After dividing a display area into a plurality of spaces according to the predetermined mapping mode, it then displays the search subject mapped to the plurality of spaces on the display 110. Finally, a user selects a key of keypad corresponding to the position of the search subject that the user wants to call, on the window, to perform the calling function.

FIGS. 2A, 2B, 2C, 2D, 2E are graphical representations illustrating keys allocated in a mobile terminal according to embodiments of the present invention.

Figure 2A:
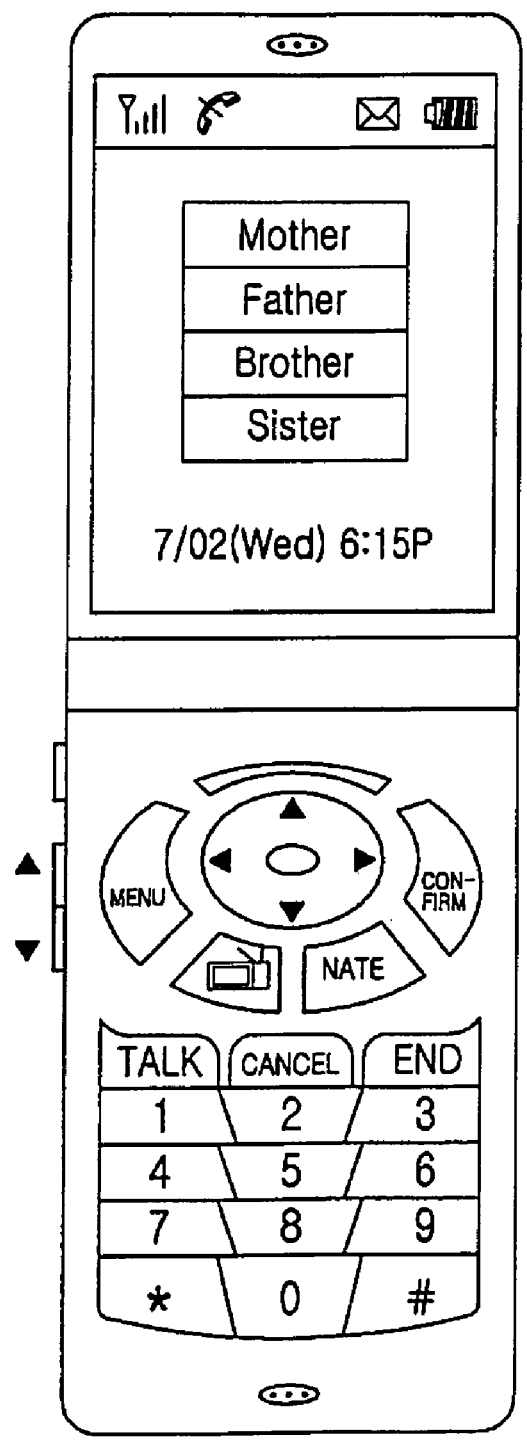
FIG. 2A is a graphical representation illustrating keys allocated in accordance with a 4*1 matrix structure in a mobile terminal according to an embodiment of the present invention.

FIG. 2A is a graphical representation illustrating keys allocated in accordance with a 4*1 matrix structure in a mobile terminal according to an embodiment of the present invention. When a phone number and a key number for the hot-key function is input by user, the phone number and the key number in association with each other are stored at a database by a controller 100. When searching for a telephone number using a hot-key function is performed, a controller divides a display area into a plurality of spaces then assigns the stored telephone numbers from the database 106 to the divided each space and outputs the assigned telephone numbers on the display 110.

When a user sets up keys allocated in accordance with the 4*1 matrix structure, a screen is shown in FIG. 2A (i.e. 4*1 matrix person information). The user dials a telephone number that he (or she) wants to call by touching a mapped key of the keypad corresponding to the position of the person whom the user wants to call, as displayed on the window. Herein, four number keys in the center column of keypad, not including special characters, may be mapped corresponding to the 4*1 matrix.

For example, when a user wants to call his or her mother, the user selects and touches key (2), which is the uppermost number key in the center column of the keypad and corresponds to the position of "Mother" that is displayed in the 4*1 matrix on the window. When the user wants to call his or her sister, the user selects and touches key (0), which is the lowest number key in the center column of keypad and corresponds to the position of "Sister" in the 4*1 matrix on the window.

For further search, navigation (directional) keys (▲/▼/▶/◀) may be used to scroll the screen or open a new screen.

In conventional systems, a user makes a call by touching a confirmation key to select the search subject, i.e. the person whom the user wants to call, on a window, and then the user must touch a "Talk" key. However, in the present invention, the user can call only by touching a key of keypad corresponding to the position of the search subject (e.g. person's name) on the window.

Figure 2B:
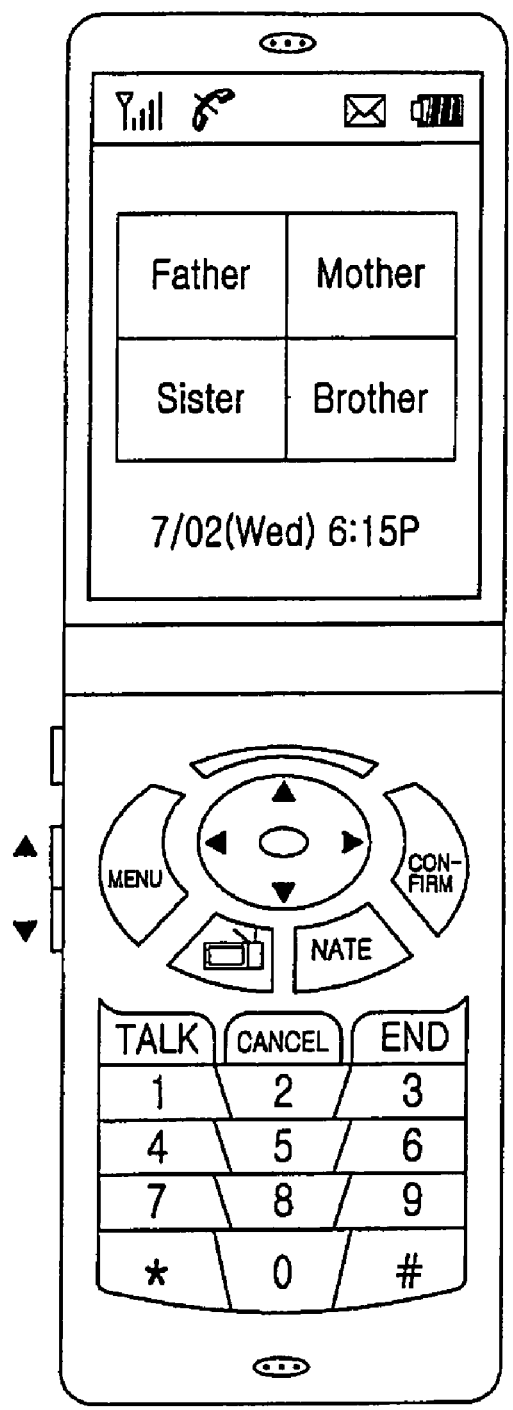
FIG. 2B is a graphical representation illustrating keys allocated in accordance with a 2*2 matrix structure in a mobile terminal according to another embodiment of the present invention.

FIG. 2B is a graphical representation illustrating keys allocated in accordance with a 2*2 matrix structure in a mobile terminal according to another embodiment of the present invention. It is preferable to map the 2*2 matrix structure to keys (1, 2, 4, 5) of the keypad. For example, when a user wants to call his or her sister, the user selects and touches key (4) at the second row in the first column of keypad. It is possible to make the call only by touching a key of keypad corresponding to the position of the search subject (person's name) on the window, without having to touch a confirmation key or a Talk key.

Figure 2C:
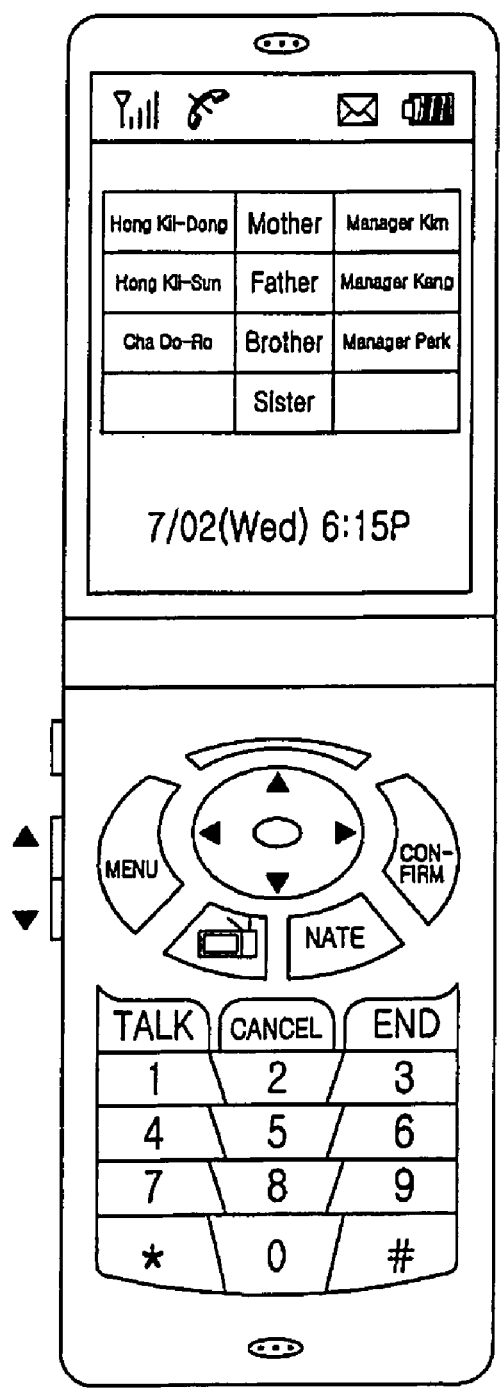
FIG. 2C is a graphical representation illustrating keys allocated in accordance with a 4*3 matrix structure in a mobile terminal according to another embodiment of the present invention.

FIG. 2C is a graphical representation illustrating keys allocated in accordance with a 4*3 matrix structure in a mobile terminal according to an embodiment of the present invention. This 4*3 matrix structure is the most preferable matrix structure because it uses all of the number keys as hot-keys that respectively correspond to positions of the search subject on a window. As explained above, a user can make a call to Manager Park by touching key (9) at the third row in the third column of keypad, corresponding to the position of "Manager Park" of the window.

Figure 2D:
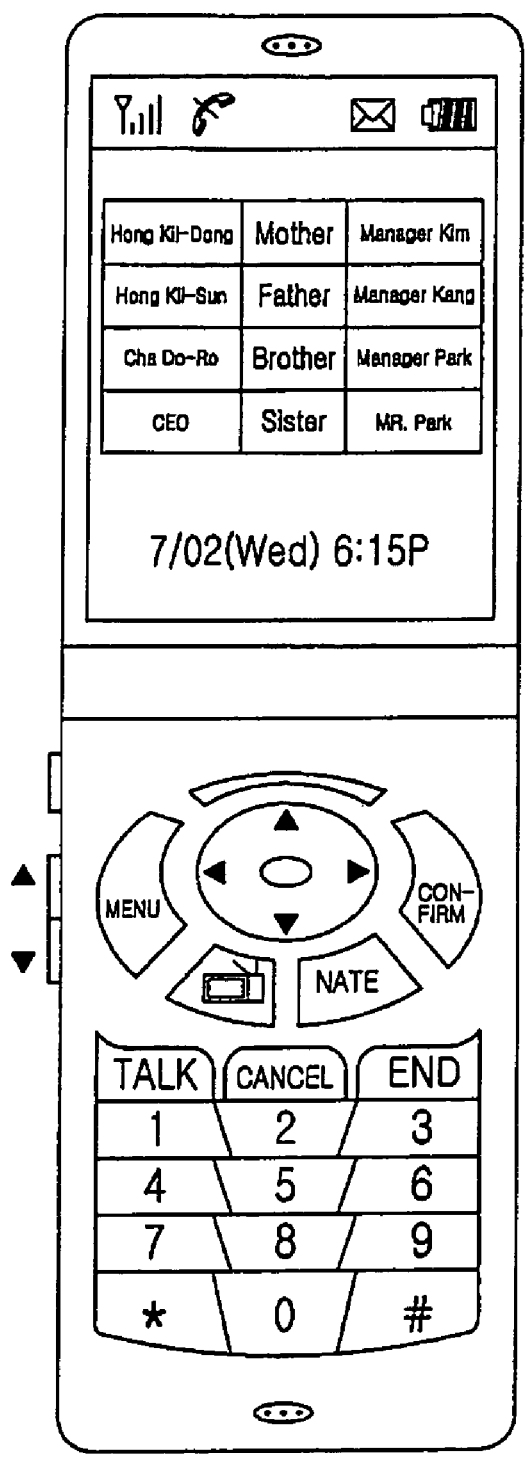
FIG. 2D is a graphical representation illustrating keys, including special characters # and *, allocated in accordance with a 4*3 matrix structure in a mobile terminal according to another embodiment of the present invention.

FIG. 2D is a graphical representation illustrating keys including special characters (*, #) allocated in accordance with a 4*3 matrix structure in a mobile terminal according to an embodiment of the present invention. This matrix structure employs special character keys as well as number keys as hot-keys. In this case, a controller should map "CEO" and "Mr. Park" to special character keys * and #, respectively.

Figure 2E:
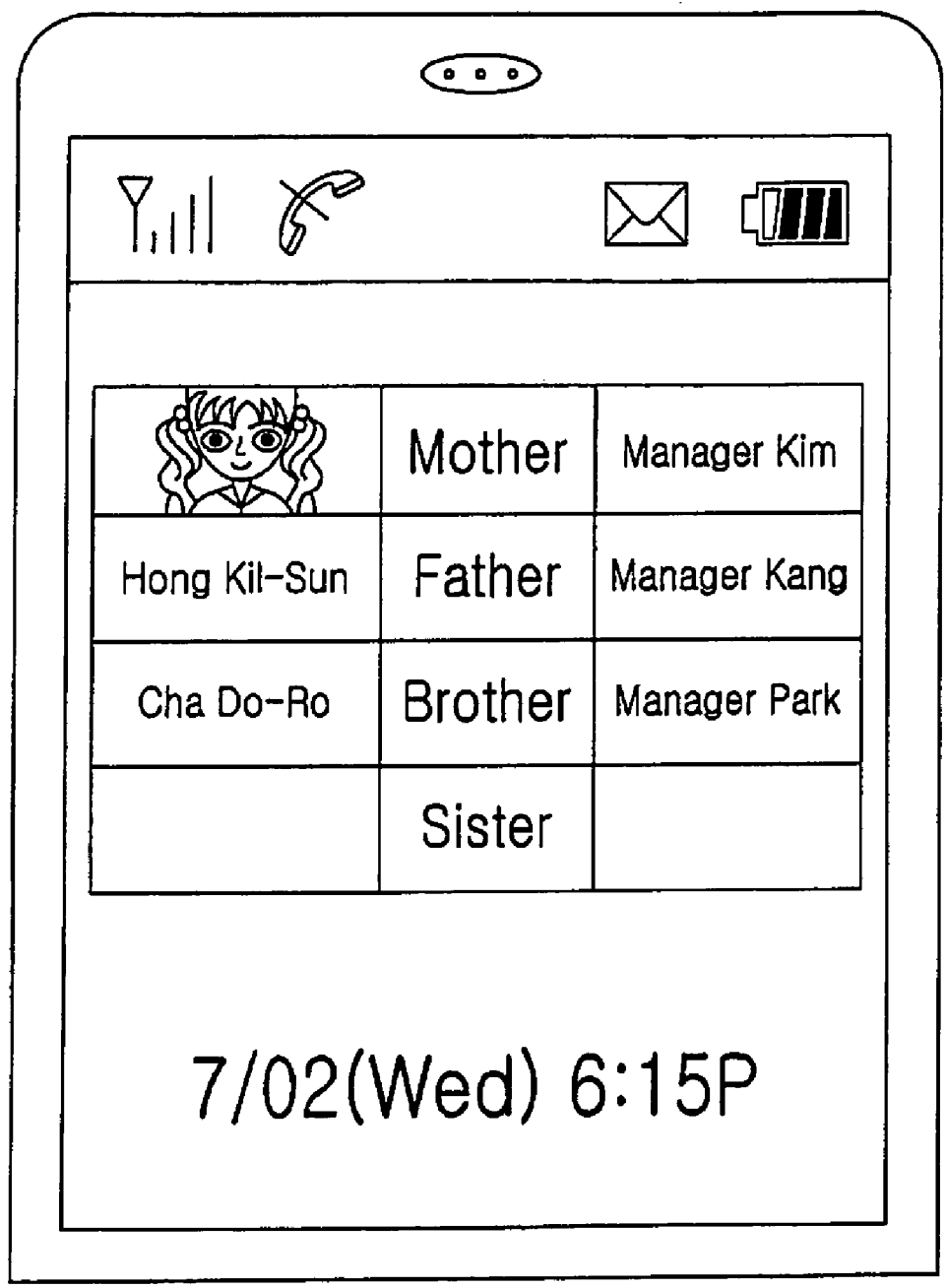
FIG. 2E is a graphical representation illustrating a screen showing person's names and image information thereof in accordance with the 4*3 matrix structure in a mobile terminal according to another embodiment of the present invention.

FIG. 2E is a graphical representation illustrating a screen wherein a person's name, picture or graphical image are displayed in accordance with the 4*3 matrix structure in a mobile terminal according to another embodiment of the present invention. As the mobile terminal adopts more multimedia functions, the screen displays telephone number, person's name, picture or graphical image and combinations thereof. As shown in FIG. 2E, when such image searching is employed, a mobile terminal should have multimedia function such as image storing, editing and displaying. Actually, recently developed mobile terminals in which image information can be stored in a phone book can employ the image information for searching for a telephone number. The details of such mobile terminals having multimedia function are understood by those of skill in the art.

Certain keys, such as directional keys, may be used to provide scrolling function for searching additional screens. That is, if a user fails to find the subject that the user wants on the first screen, he (or she) uses directional keys or a certain key having scrolling function to open new screen(s) to search further. The user can dial simply by touching a key of keypad corresponding to the position of the search subject chosen by the user, on a window.

For example, when twenty (20) telephone numbers having storage addresses 1 to 20 are stored at the database and a 4*3 matrix structure having ten subjects is set up, ten of the telephone numbers having storage addresses 1 to 10 are mapped and displayed in the form of the matrix structure on a window, and the other ten of telephone numbers are displayed on the window in the same way as in the first ten of telephone numbers by scrolling via the certain key or directional key.

Figure 3:
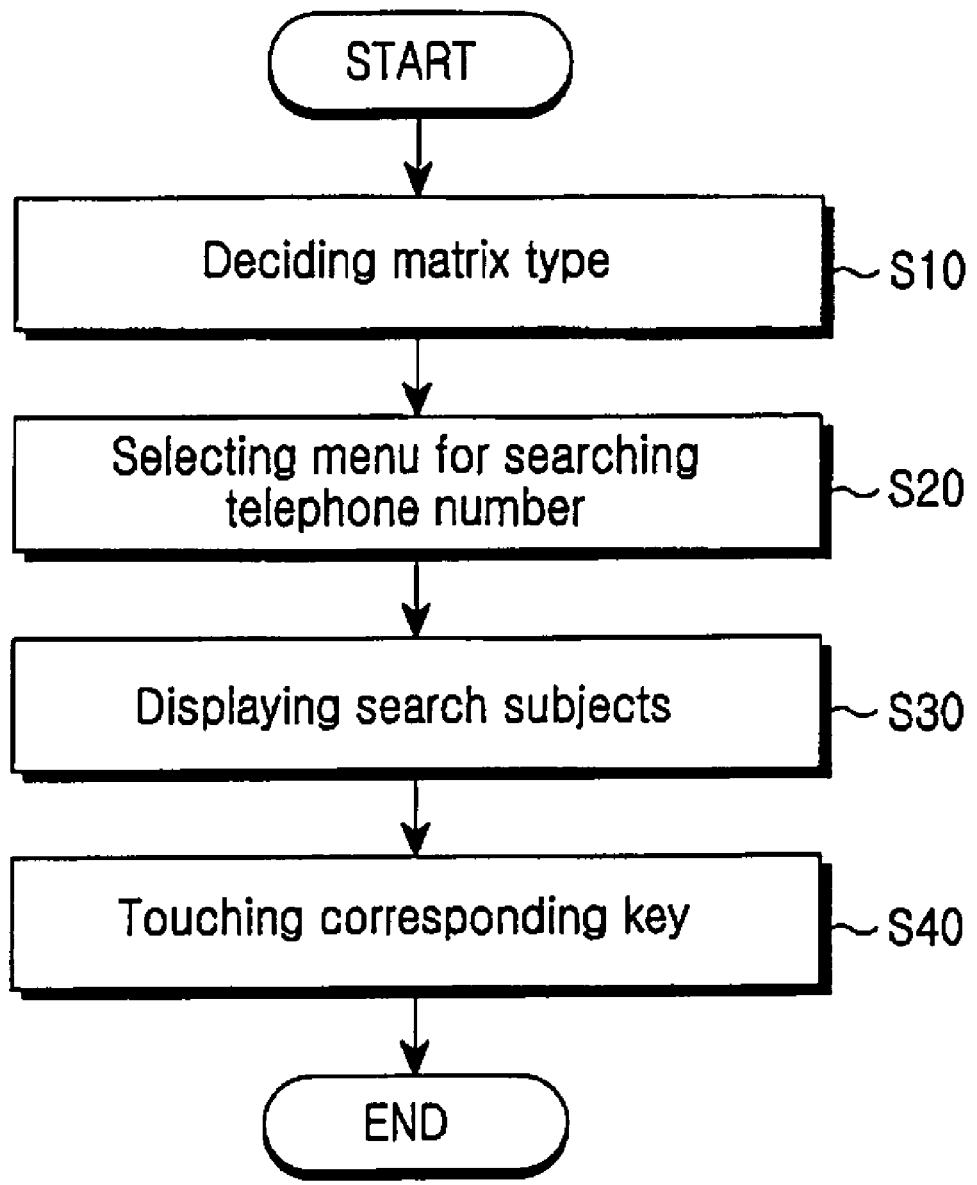
FIG. 3 is a flow chart illustrating a method for connecting a call using a hot-key function according to the present invention.

FIG. 3 is a flow chart illustrating a method for calling using a hot-key function according to the present invention. First, a user decides a matrix type of search subjects on a window in the management mode of a mobile terminal and sets up the matrix type (S10). The decided matrix type is maintained until the user resets other matrix type.

The user then selects a menu for searching telephone number (S20). Alternatively, step 20 may proceed automatically after performing step 10. However, if the user wants to change matrix type, the user may return to the management mode of a mobile terminal and reset a matrix type.

The user can select one of various matrix types, as shown in FIGS. 2A, 2B, 2C, 2D and 2E, in a mobile terminal. To search for as many subjects as possible, it is preferable to adopt 4*3 matrix structure.

If a user does not reset the matrix type after step 20, the search subjects are displayed on a window in the form of the matrix as selected (S30). The user can directly dial the person whom the user wants to call by touching the mapped key of the keypad corresponding to the position of the search subject that the user chose, on the window (S40).

While the invention has been shown and described with reference to preferred embodiments thereof, it will be understood by those skilled in the art that various changes in form and details may be made therein without departing from the spirit and scope of the invention, as defined by the appended claims.

What is claimed is;

1. An apparatus for calling by a user using a hot-key function, comprising:
    a database for storing information of search subjects, the information including images and telephone numbers of the search subjects;
    a keypad having a plurality of keypad keys;
    a controller for extracting the information from said database and mapping the information to respective keypad keys, in accordance with a mapping mode; and
    a display for displaying said images in an image matrix structure including a 4*3 matrix structure, the image matrix structure corresponding to a keypad key matrix structure of the mapped keypad keys,
    wherein the user initiates a call by choosing an image among the displayed images and touching one keypad key corresponding to the chosen image.

2. The apparatus of claim 1, wherein said controller performs mapping in accordance with one of various mapping modes.

3. The apparatus of claim 1, wherein said controller resets the mapping mode.

4. A method for calling using a hot-key function in a mobile terminal including a keypad having a plurality of keypad keys, comprising:
    displaying a plurality of search subjects extracted from a database on a window in a display matrix structure including a 4*3 matrix structure, the displayed search subjects corresponding to respective keypad keys in accordance with a mapping mode, the display matrix structure corresponding to a keypad key matrix structure of the mapped keypad keys; and
    initiating a call by selecting a searched subject from among the displayed search subjects and touching one keypad key corresponding to the selected searched subject.

5. The method of claim 4, wherein prior to said displaying step, the steps of selecting one of a plurality of mapping modes and setting the mapping mode are performed.

6. The method of claim 4, wherein said displaying step is preceded by selecting a menu for searching telephone number.

7. The method of claim 4, wherein said displaying step is preceded by deciding a matrix type.

8. The method of claim 7, wherein said displaying step further comprises resetting the matrix type.

9. The method of claim 4, wherein the display of said search subjects on the window includes image information.

10. The method of claim 4, wherein the display of said search subjects on the window includes telephone numbers, person's names and image information.

* * * * *